May 14, 1946.    C. C. DAVENPORT    2,400,392
TURBINE APPARATUS
Filed April 10, 1943    2 Sheets-Sheet 1
Fig. 1.
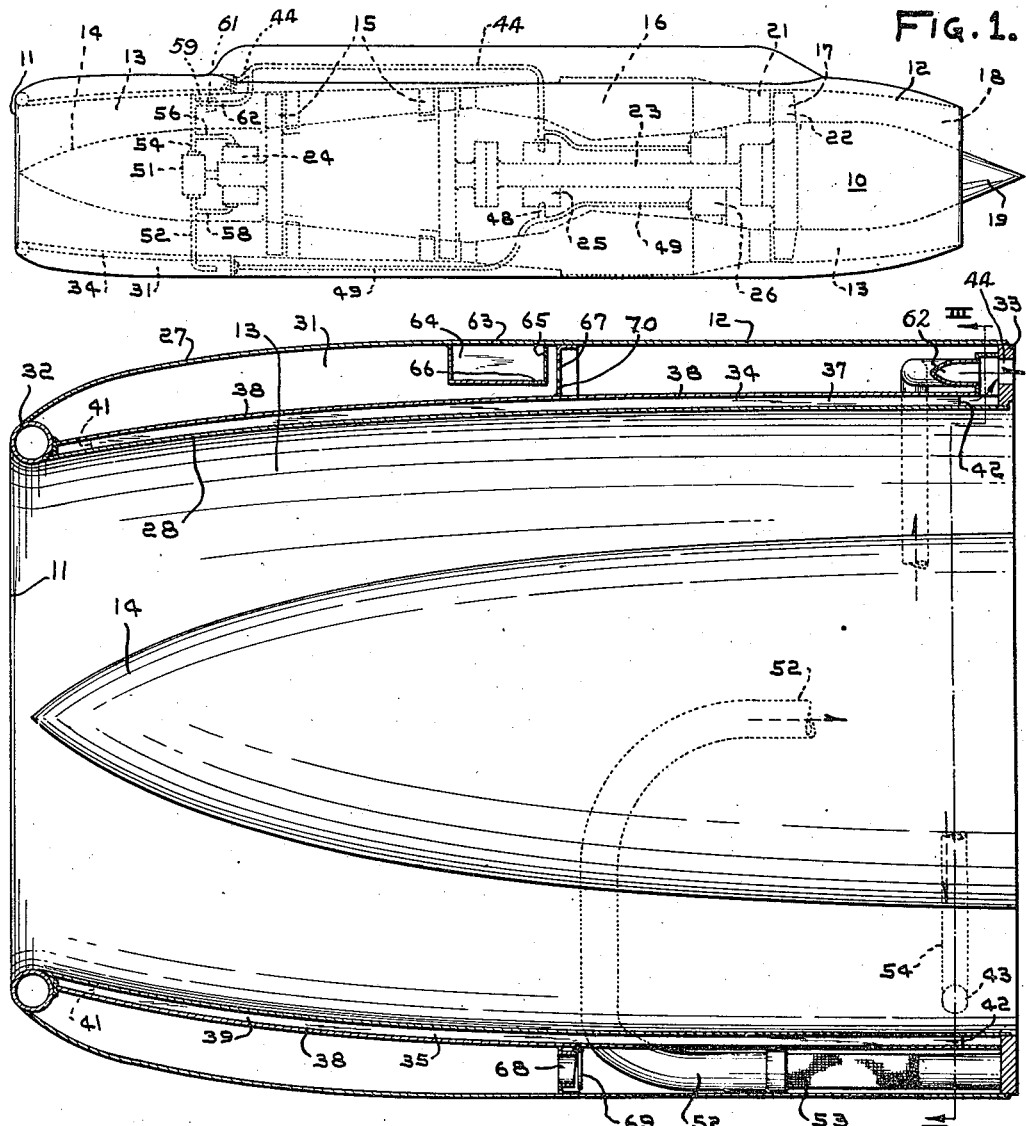
Fig. 2.
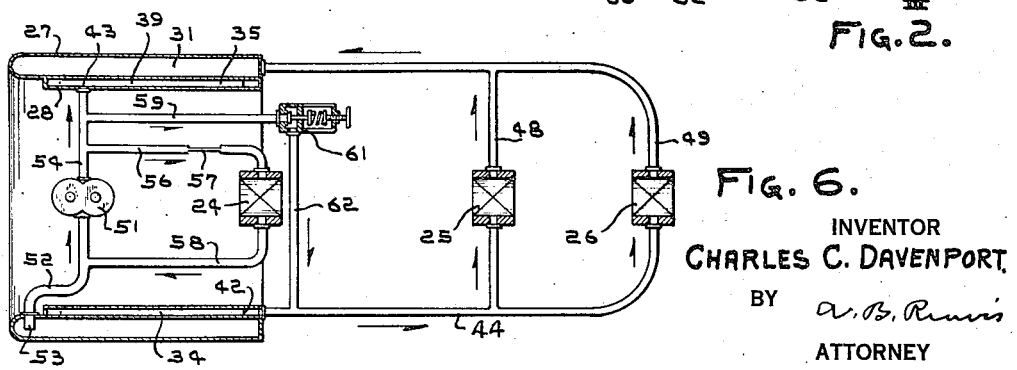
Fig. 6.
INVENTOR
CHARLES C. DAVENPORT.
BY
ATTORNEY May 14, 1946.                C. C. DAVENPORT                2,400,392
                              TURBINE APPARATUS
                            Filed April 10, 1943            2 Sheets-Sheet 2
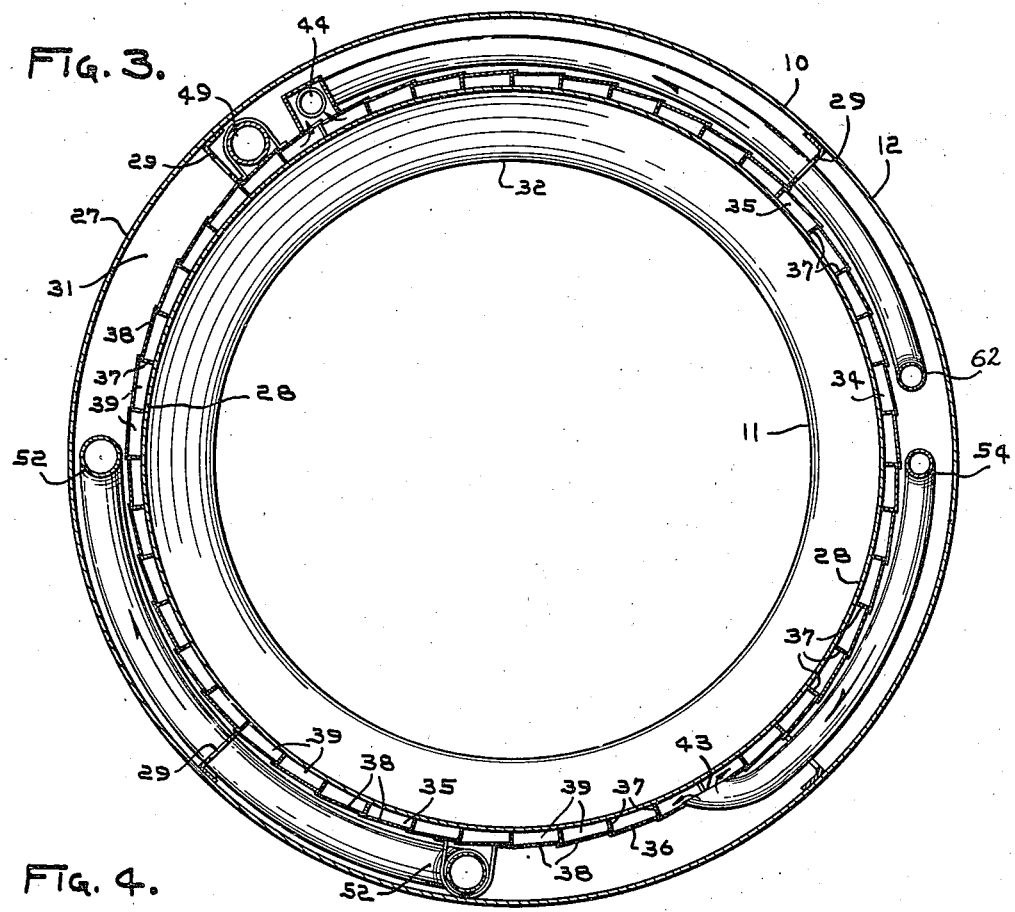
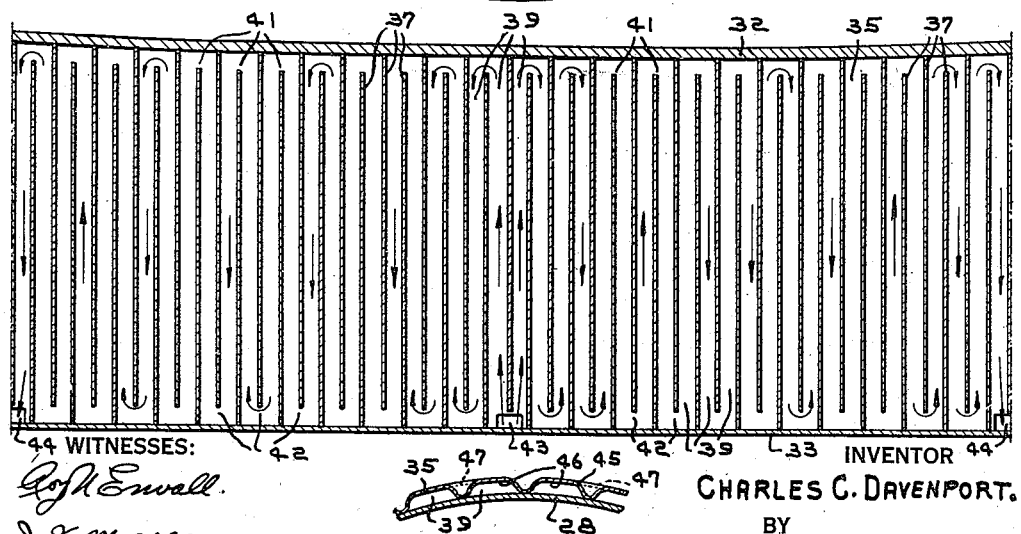
INVENTOR
CHARLES C. DAVENPORT.

Patented May 14, 1946

2,400,392

UNITED STATES PATENT OFFICE 2,400,392

TURBINE APPARATUS

Charles C. Davenport, Media, Pa., assignor to Westinghouse Electric Corporation, East Pittsburgh, Pa., a corporation of Pennsylvania Application April 10, 1943, Serial No. 482,545

13 Claims. (Cl. 184—6)

The invention relates to power plants of the gas turbine type, and it has for an object to provide improved cooling means for the oil of the lubricating system thereof.

In the application of Stewart Way, Serial No. 482,533, filed April 10, 1943, there is disclosed and claimed a type of power plant which has a relatively small maximum diameter and which is constructed and arranged to impose minimum drag when used for aircraft propulsion. In accordance with my invention, I preserve the advantage of reduced drag and, at the same time, obtain effective and efficient cooling of the oil of the lubricating system by having the oil cooler formed as a part of the wall enclosure of the compressor.

Therefore, a further object of the invention is to provide a gas turbine plant including a compressor and wherein the casing of the latter is formed as an oil cooler.

A further object of the invention is to provide a lubricating oil cooler in the form of a convoluted passage bounded in part by the tubular wall of the compressor.

A further object of the invention is to provide a lubricating oil reservoir bounded by an outer tubular shell and by an inner oil cooler, the latter including a convoluted passage bounded in part by the compressor tubular wall.

A further object of the invention is to provide an improved heat exchanger, particularly adapted for cooling oil of a lubricating system of a power plant for aircraft, which fits conveniently into available space without increasing the drag, which is relatively light and does not substantially increase the diameter of the plant, and which is effective to cool the lubricating oil with the plant idling and the aircraft not in flight.

These and other objects are effected by my invention and will be apparent from the following description and claims taken in connection with the accompanying drawings, forming a part of this application, in which:

Fig. 1 is a side elevational view of a power plant in which the present invention is incorporated;

Fig. 2 is an enlarged sectional view of the left or intake end of the plant shown in Fig. 1;

Fig. 3 is a sectional view taken substantially on the line III—III of Fig. 2;

Fig. 4 is a developed sectional view of the heat exchanger or oil cooler of the lubricating system of the power plant;

Fig. 5 is a fragmentary sectional view illustrating a slightly modified heat exchanger; and, Fig. 6 is a diagrammatic view of the lubricating system of the plant shown in Fig. 1.

The power plant shown in Fig. 1 and generally indicated 10, is adapted to be mounted in or on the fuselage or wings of an airplane with the left or intake end 11, as viewed in this figure, pointed in the direction of flight. The power plant comprises an outer shell or casing structure 12 providing an air duct 13 extending fore and aft with respect to the aircraft. The casing has mounted therein, along its longitudinal axis, a nose portion 14 in which fuel and lubricating oil pumps and ignition apparatus may be supported. The plant includes an axial-flow compressor generally indicated at 15, a combustion apparatus 16, a turbine 17, and a propulsion nozzle 18 defined by the casing and a tailpiece 19.

Air enters at the intake end 11, flows through the compressor 15 where it is compressed, and into the combustion apparatus 16, which may be of any suitable construction and arranged to add heat to the compressed air supplied by the compressor. The hot gases on leaving the combustion apparatus are directed by suitable guide vanes 21 against the blades 22 of the turbine rotor 23 and then discharged through the propulsion nozzle 18.

The compressor rotor and turbine rotor are connected by a shaft 23 journaled in bearings 24, 25, and 26 supported within the casing and along the axis thereof.

The present invention is not limited to the exact details or arrangement of the structure thus far described, but is primarily concerned with the manner of lubricating the bearings 24, 25, and 26, and particularly to a heat exchanger for cooling oil supplied to at least some of the latter. As previously mentioned, the device is intended to be operated at extremely high speeds, which may be of the order of 18,000 to 20,000 r. p. m., and since at least two of the bearings are mounted in the region of the hot combustion apparatus 16, it is important that the oil circulating through these bearings be cooled.

As shown in Figs. 2, 3 and 4, the forward or compressor part of the casing structure 12 is formed as a double-walled construction, it being comprised by the outer shell 27 and an inner shell 28 secured in spaced coaxial relation by means of circumferentially-spaced, perforate and radially-extending ribs 29 defining a chamber 31 whose ends are closed by the rings 32 and 33 attached to the ends of the outer and inner walls or shells. The chamber 31 serves as an oil reservoir and houses the oil cooler, indicated generally at 34.

The inner wall or shell 28 functions, with structure to be described, to provide convoluted oil cooler passages 35, each of which, in effect, is folded back and forth upon itself and through which the lubricating oil from the reservoir 31 circulates before being supplied to the bearings.

As illustrated in Figs. 3 and 4, a series of angle strips 36 extend lengthwise of the outer surface of the inner shell 28 and cooperate with the latter to provide the passages 35. Each of the strips includes a relatively narrow partition flange 37 and a wider cover flange 38. The partition flanges are secured in circumferentially-spaced relation about the outer surface of the inner shell 28, as by welding, while the cover flanges 38 are secured to adjacent strips, preferably in overlapping relation, to provide a circumferential arrangement of passages or passes 39 extending lengthwise of the casing structure.

The ends of the passages 39 are closed by the end rings 32 and 33 and the partition flanges 37 are shortened alternately at opposite ends to form openings 41 and 42 affording communication of the passages to provide for series-flow, multiple-pass arrangements thereof to form the convoluted passages 35.

Lubricating oil enters the cooler through an inlet 43 which opens into two adjacent passages or passes 39, forming the initial passes of the pair of series-flow, multiple-pass convoluted passages 35, and flowing in parallel through the latter to the conduit 44 for supplying cooled oil to bearings, as hereinafter described.

The flow reversing connections of adjacent passages or passes 39 assures that the laminar layer of the stream of oil flowing along the outer surface of the wall or shell of a passage shall be thoroughly admixed with the remainder of the oil before flowing along the succeeding pass, thereby promoting better heat transfer. Furthermore, the construction already described lends itself to the ready formation of the passes, each of such flow area as to give a reasonable velocity to the oil, the heat transfer being improved by increasing the velocity.

By utilizing structure of the casing of the plant to accommodate the oil cooler and the oil reservoir, these components are provided without substantially increasing the weight of the plant or the drag thereof when used on aircraft. Furthermore, by having the cooler arranged so that cooling is effected by air flowing through the duct 13, it is assured that cooling shall be effected even though the plant may be stationary, as when the apparatus is idling and the aircraft is not in flight. Furthermore, it will be apparent that cooling is afforded in several ways. Heat is transferred from oil in the reservoir through the outer shell to ambient air, heat from the oil is transferred to the inner shell and is conducted to outer shell and eliminated to air and, as the reservoir is bounded in part by the cooler, heat is also transferred from such oil to oil flowing through the convoluted passage. The major portion of the heat transfer, however, occurs from oil flowing along the convoluted passage to air flowing internally of the tubular wall or shell 28, particularly as the latter bounds in part the convoluted passage.

Fig. 5 shows a modified form of oil cooler. In this construction, metallic sheet material 45 is shaped to provide parallel ribs 46, which are disposed lengthwise of and welded or brazed to the inner shell 28 to provide the passes 39 of the convoluted passages 35. As with the partition flanges 37 already described, the ribs 46 terminate alternately short of the ends of the structure so as to leave cross-over spaces 47 connecting adjacent passes in series.

Operation

A clear understanding of the operation of the cooler and the lubricating system will be had by reference to diagrammatic Fig. 6.

Lubricating oil leaving the bearings 25 and 26 returns to the reservoir through conduits 48 and 49. A pump 51 driven by the turbine has a suction conduit 52 whose inlet is provided with a removable filter 53 disposed in the bottom of the reservoir. The pump supplies oil through a discharge conduit 54 to the inlet 43 of the oil cooler, the oil flowing through the latter and through the conduit 44 to the bearings 25 and 26.

As the bearing 24 is located at a region of the plant which is relatively cooler than those of the bearings 25 and 26, it is feasible to supply it with oil directly from the pump instead of from the cooler; however, to assure of adequate distribution of oil and maintenance of sufficient pressure for flow through the cooler and to the other bearings, the conduit 56 for the bearing 24 is preferably provided with a suitable restriction, such as the orifice 57. Oil leaving the bearing 24 is preferably returned to the pump suction conduit 52 by means of the conduit 58.

To insure an immediate supply of oil to the bearings when starting the power plant under extremely cold conditions, which might result in temporary thickening of the oil in the oil cooler, a pressure-controlled by-pass is provided around the cooler. The by-pass comprises a conduit 59 connected to the pump discharge conduit 54 and an adjustable pressure relief valve 61. The valve 61 in turn is connected by a conduit 62 to the bearing supply conduit 44. The relief valve is adjusted to open at a predetermined oil pressure obtained when flow through the oil cooler is restricted, and insures prompt delivery of oil to the bearings through the conduits 59 and 62.

The oil reservoir is vented to the atmosphere through a small opening 63 (Fig. 2) located in the top of the casing 12. A baffle in the form of a box 64 is secured to the inner surface of the casing below the opening 63. The baffle prevents any substantial amount of oil from running out the opening 63 when the aircraft is inverted, and it is provided with one or more vent openings 65 in the side walls and an opening 66 in the bottom for draining any oil collecting therein.

To prevent the oil in the reservoir from collecting in the fore part of the reservoir when the aircraft is nosed down, a baffle or partition ring 70 is provided substantially midway of the reservoir and it divides the latter into two compartments communicating through an opening 67 at the top of the ring and an opening 68 at the bottom. The bottom opening 68 is normally open, but it is closed by means of a hinged flap valve 69 when the plane is nosed down, preventing the oil from running to the front of the reservoir, thereby maintaining submergence of the inlet end of the suction conduit 52 and the filter 53 at all times.

It is to be understood that the word "convoluted," as used herein in relation to the passage 35, means any conformation of the passage, such as bending to and fro upon itself or helical winding, so long as the requisite linear extent is provided and the described relations are preserved.

While the invention has been shown in several forms, it will be obvious to those skilled in the art that it is not so limited, but is susceptible of various other changes and modifications without departing from the spirit thereof, and it is desired, therefore, that only such limitations shall be placed thereupon as are specifically set forth in the appended claims.

What is claimed is:

1. In a lubricating system for bearings of a plant wherein a compressor driven by a turbine withdraws air from the atmosphere and is effective to compress the air to furnish motive fluid for the turbine, and wherein a wall bounds the inlet and compressor passage; a cooler including a convoluted flow passage bounded in part by said wall and separated by the latter from said inlet and compressor passage; and means providing for circulation of lubricating oil through the convoluted passage in order that heat of the oil may be transferred by the wall to air flowing through the inlet and compressor passage.

2. In a lubricating system for bearings of a plant wherein a compressor driven by a turbine withdraws air from the atmosphere and is effective to compress the air to furnish motive fluid for the turbine, and wherein a wall bounds the inlet and compressor passage; a cooler including a convoluted flow passage bounded in part by said wall and separated by the latter from said inlet and compressor passage; a reservoir for oil returning from bearings and bounded in part by said cooler; and means for causing oil to flow from the reservoir through the convoluted passage to bearings.

3. In a lubricating system for bearings of a plant wherein an axial-flow compressor driven by a turbine withdraws air from the atmosphere and is effective to compress the air to furnish motive fluid for the turbine, and wherein a tubular wall bounds the inlet and compressor passage; a cooler including a convoluted passage bounded in part by at least the inlet end portion of said tubular wall and separated by the latter from the inlet and compressor passage; and means providing for circulation of lubricating oil through the convoluted passage in order that heat of the oil may be transferred by the wall to air flowing through the inlet and compressor passage.

4. The system as claimed in claim 3 wherein the cooler is disposed circumferentially of the tubular wall.

5. The system as claimed in claim 3 wherein the convoluted passage includes a plurality of substantially parallel passes extending lengthwise of the compressor.

6. In a lubricating system for bearings of a plant wherein an axial-flow compressor driven by a turbine withdraws air from the atmosphere and is effective to compress the air to furnish motive fluid for the turbine, and wherein a tubular wall bounds the inlet and compressor passage; a cooler including a convoluted passage bounded in part by at least the inlet end portion of said tubular wall and separated by the latter from the inlet and compressor passage; a tubular wall spaced radially outward from the cooler and cooperating with the latter to provide a reservoir for oil returning from bearings; and means for causing oil to flow from the reservoir through the convoluted passage to bearings.

7. In a lubricating system for bearings of a plant wherein an axial-flow compressor driven by a turbine withdraws air from the atmosphere and is effective to compress the air to furnish motive fluid for the turbine, and wherein a tubular wall bounds the inlet and compressor passage; a cooler including a pair of convoluted passages each of which is bounded in part by said tubular wall and separated by the latter from the inlet and compressor passage; and means providing for circulation of lubricating oil in parallel through the convoluted passages in order that heat of the oil may be transferred by the wall to gaseous medium flowing through the inlet and compressor passage.

8. The system as claimed in claim 7 wherein each of the convoluted passages includes a plurality of substantially parallel passes extending lengthwise of the tubular wall.

9. The system as claimed in claim 7 wherein the cooler is disposed circumferentially about the tubular wall and each of the convoluted passages thereof includes a plurality of substantially parallel passes extending lengthwise of the wall.

10. In a lubricating system for bearings of a plant wherein an axial-flow compressor driven by a turbine withdraws air from the atmosphere and is effective to compress the air to furnish motive fluid for the turbine, and wherein a tubular wall bounds the inlet and compressor passage; a cooler embracing at least the inlet end portion of said tubular wall and including a convoluted passage bounded in part by said wall and separated by the latter from the inlet and compressor passage; a tubular wall spaced radially outward from the cooler and cooperating with the latter to define a reservoir for lubricating oil returning from bearings; a circumferential partition dividing the reservoir into a forward portion adjacent to the inlet end of the compressor and into a rearward portion; means for causing oil to flow through the convoluted passage and then to bearings and including a suction conduit communicating with the bottom part of the rearward portion of said reservoir; and valve means carried by the lower part of said partition and operative normally to provide for flow of oil from the forward to the rearward portion of said reservoir and to prevent flow from the rearward to the forward portion when the compressor occupies an inclined position with the forward portion disposed below the rearward portion.

11. In a lubricating system for bearings of a plant wherein an axial-flow compressor driven by a turbine withdraws air from the atmosphere and is effective to compress the air to furnish motive fluid for the turbine, said bearings being located so as to be subject to lower and higher temperatures, and wherein a tubular wall bounds the inlet and compressor passage; a cooler including a convoluted passage bounded in part by at least the inlet end portion of said tubular wall and separated by the latter from the inlet and compressor passage; a reservoir for lubricating oil returning from the bearings and bounded in part by the cooler; a pump; a suction conduit for the pump and communicating with the reservoir; a discharge conduit for the pump and connected to the convoluted passage to effect flow of lubricating oil through the latter; a conduit for supplying oil leaving the convoluted passage to the bearing or bearings of higher temperature; and a conduit connected to said discharge conduit between the pump and the cooler and arranged to supply oil directly from the pump to the bearing or bearings at lower temperature; and means for restricting the flow of lubricating oil through the last-named conduit.

12. In a lubricating system for bearings of a plant wherein an axial-flow compressor driven by a turbine withdraws air from the atmosphere and is effective to compress the air to furnish motive fluid from the turbine, and wherein a tubular wall bounds the inlet and compressor passage, said bearings being located in regions of higher and lower temperature; a cooler including a convoluted passage bounded in part by said tubular wall and separated by the latter from the inlet and compressor passage; a reservoir for lubricating oil returning from bearings and bounded in part by the cooler; a pump; a suction conduit communicating with the reservoir and connected to the inlet of the pump; a discharge conduit for supplying oil from the pump to the cooler; a supply conduit for supplying oil from the cooler to the bearing or bearings of higher temperature; said discharge and supply conduits being connected to the cooler so that oil in passing from the discharge conduit to the supply conduit is constrained to flow entirely through the convoluted passage; a by-pass conduit providing for flow of oil from the discharge conduit directly to bearings; a loaded relief valve cooperating with the by-pass conduit and operative to prevent flow therethrough except when a predetermnied pressure is exceeded in the discharge conduit; a conduit for supplying oil from the discharge conduit to the bearing or bearings of lower temperature; and means for restricting the flow of oil through the last-named conduit.

13. In a lubricating system for bearings of a plant wherein an axial-flow compressor driven by a turbine withdraws air from the atmosphere and is effective to compress the air to furnish motive fluid for the turbine, and wherein a tubular wall bounds the inlet and compressor passage; a cooler including a convoluted passage bounded in part by said tubular wall and separated by the latter from the inlet and compressor passage; a reservoir for oil returning from bearings and bounded in part by the cooler; a pump; a suction conduit for the pump communicating with the reservoir; a discharge conduit for the pump communicating with the cooler; a supply conduit for bearings and communicating with the cooler; said discharge and supply conduits being connected to the cooler so that oil is constrained to flow entirely through the convoluted passage in passing from the discharge conduit to the supply conduit; a by-pass conduit providing for the flow of oil from the discharge conduit directly to bearings; and means including a pressure-responsive relief valve for preventing flow through the by-pass conduit except when a predetermined pressure in the discharge conduit is exceeded.

CHARLES C. DAVENPORT.